March 10, 1964  A. TOBLER  3,124,269
APPARATUS FOR FREEING ELEMENTS IN A CHUTE
Filed Dec. 19, 1960
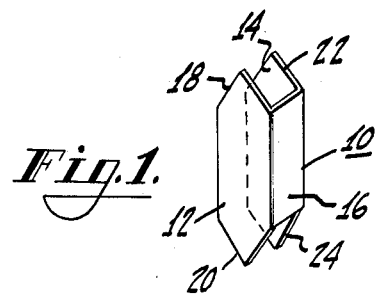
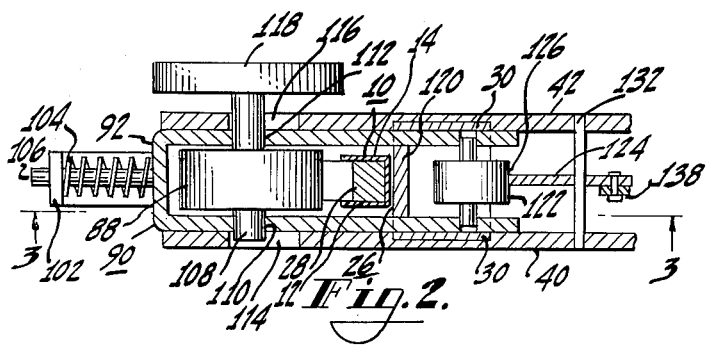
INVENTOR.
ARNOLD TOBLER
BY
William A. Zalesak
ATTORNEY

United States Patent Office 3,124,269
Patented Mar. 10, 1964

3,124,269
APPARATUS FOR FREEING ELEMENTS IN A CHUTE
Arnold Tobler, East Orange, N.J., assignor to Radio Corporation of America, a corporation of Delaware
Filed Dec. 19, 1960, Ser. No. 76,632
4 Claims. (Cl. 221—251)

This invention relates to apparatus for feeding elements down a chute, for example, elements such as vacuum tube elements, down a chute to a vacuum tube cage assembly position.

Vacuum tube cages are often assembled by machines. These tube cages comprise an upper and lower insulating wafer, usually of mica, between which the tube elements are held usually by means of electrode ends or extensions extending through holes in the micas. In the process of assembling the cage, the various tube parts are fed to a cage assembly position, or positions, usually by means of chutes. The elements must be fed to such positions at accurate intervals, one at a time, and therefore an escapement mechanism is used in the chute. A known escapement mechanism comprises a pair of fingers. In one position of the escape mechanism, one finger is positioned below the stack of tube elements in the chute so that no tube element can go down the chute below this finger, and the other finger is in its withdrawn position, whereby the tube elements are stacked in the chute above the one finger. In another position of the escapement mechanism, the other finger holds all the parts in the chute except the bottom part, while the first finger is withdrawn to permit the bottom part to feed down the chute to the cage assembly position by gravity. Sometimes, however, the tube element in the chute below the upper finger, that is, the bottom element, will not slide down the chute to the cage assembly position because it has been jammed into the tube element just above it by the weight of the several tube elements in the chute. This jamming prevents proper feeding of a part, whereby further tube assembly cannot take place until the bottom tube element is freed. This jamming is particularly prevalent where, as noted above, a tube part has ears or extensions extending therefrom upwardly or downwardly, or both, from the body portion of the element. These ears or extensions which enter cooperating holes in the micas or insulating wafers comprising the top and the bottom of the vacuum tube cage, jam together in such a manner that the bottom tube element in the chute is suspended by the tube element just above it whereby the tube elements do not feed to the tube assembly position.

It is an object of this invention to provide apparatus for positively feeding tube elements to an assembly position from a chute.

It is an object to provide apparatus for freeing the bottom tube element of a stack of elements and for feeding it to an assembly position.

It is an object of this invention to provide apparatus for freeing and feeding the bottom tube element in a chute having a stack of tube elements therein, from the tube element thereinabove.

My device for accomplishing these objects comprises a constantly rotating frictional roller and means to cause contact of the frictional roller with the bottom-most tube element in the chute immediately after the lower escapement pin or finger has been withdrawn to the position where it no longer supports the bottom-most tube element in the chute. The rotating frictional roller is moved away from the tube element contacting position as soon as the lower escapement finger moves to the position where it supports the whole stack of tube elements including the bottom one.

My invention may best be understood upon reading the following description thereof in connection with the accompanying drawings:

FIG. 1 shows a vacuum tube anode of the type which is particularly likely to become jammed in an anode feeding chute;

FIG. 2 is a plan view in section on line 2—2 of FIG. 3, of my apparatus for freeing such an anode; and FIG. 3 is an elevational view, partly in section, on line 3—3 of FIG. 2 and, further, showing an escapement mechanism.

FIG. 1 illustrates a tube element, in this case an anode 10, of the type that jams if fed down a chute. This anode 10 is channeled-shaped and comprises two parallel sides 12 and 14 and a bridging side 16 joining the parallel sides 12 and 14. This anode 10 also comprises extensions or ears 18 and 20 on the ends of side 12 and extensions or ears 22 and 24 on the ends of side 14. These anodes 10 are stacked in a chute, one above the other, as shown in FIGS. 2 and 3 by any well-known mechanism or by hand. When so stacked, the elements are telescoped to a certain extent by their weight whereby the ears or extensions overlap each other as shown in FIG. 3 and therefore the anodes may be jammed together and may not feed out of the chute by gravity alone.

The presently illustrated chute 26 (FIGS. 2 and 3) comprises a vertical bar 28 and a lateral or guide support 30. The vertical bar 28 has a cut away portion 32, as shown in FIG. 3 for a purpose to be described. The channel support 30 is located to the right of the vertical bar 28 as shown in FIGS. 2 and 3. As shown in these figures, channel-shaped anodes 10 fit partially around the vertical bar 28 with the bridged side of the anodes between the vertical bar 28 and the support 30. The anode sides 12 and 14 embrace the bar 28 which helps guide them.

The escapement mechanism 34 is mounted on the lateral support 30 between a pair of upper and lower plates 36 and 38, respectively. Front (lower in FIG. 2) and rear plates 40 and 42 mounted between upper and lower plates 36 and 38 complete the enclosure in which the escapement 34 is supported. This escapement 34 comprises an upper and lower fingers 44 and 46 extending through holes 48 and 50, respectively, in the lateral support 30, as well as means to move the fingers 44 and 46 back and forth in their respective holes.

The means to move the fingers comprises a three-branched rocker arm 52 pivoted at 54 between the front and rear plates 40 and 42. The right-hand ends of the fingers 44 and 46 extend, respectively, through the upper end 56 and the lower end 58 of rocker arm 52, through which they fit loosely. The right-hand end of the fingers are threaded and adjustably positionable lock nuts 60 and 62 are threaded on the ends of the fingers. Washers 64 and 66 are supplied between the lock nuts 60 and 62 and the right-hand surfaces of the upper branch 56 and the lower branch 58 of the rocker arm 52. Washers 68 and 70 are fixed, respectively, to fingers 44 and 46 spaced to the left of the upper branch 56 and the lower branch 58 of the rocker arm 52, and compression springs 72 and 74 are fitted between the fixed washers 68 and 70 and washers 76 and 78 loosely fitted on the respective fingers between the springs 72 and 74 and the left surface of the rocker 52. A solenoid 80 is mounted on upper plate 36 and it is linked by link means 84 to the third branch 82 of the rocker arm 52. A tension spring 86 fastened between the end of the third branch 82 and the lower support plate 38 urges clockwise rotation of the rocker arm 52 about its pivot 54.

Therefore, when the solenoid 80 is deenergized, the rocker arm 52 is rocked clockwise to the position shown in FIG. 3. In this position of the rocker arm 52, the lower branch 58 thereof pushes on spring 74, which, by means of fixed washer 70, pushes finger or pin 46 into engagement with vertical bar 28 at a point thereon under the stack of anodes 10. In this position, the pin 46 prevents the anodes from falling down through the chute 26 due to the contact of the bottom one of the stack of anodes with the pin or finger 46. Upon energization of the solenoid 80, rocker arm 52 is rocked counter-clockwise and the upper arm 56 thereof pushes on spring 72, which pushes the upper finger 44 to the left until it presses against the next-to-the-last anode in chute 26. As the rocker arm 52 rocks in a counter-clockwise direction, the lower finger 46 is pulled out of the chute allowing the bottom anode in the chute to fall. The positions of nuts 60 and 62 are so adjusted on their respective fingers 44 and 46 that upper finger 44 comes into contact with the next-to-the-last anode before the lower finger 46 clears the chute whereby only the lowest anode would be free to fall through the chute. However, as noted above, jamming of the anodes may prevent the lowest anode from falling out of the chute.

To free the lowest anode, a means for unjamming it and for causing it to fall out of the chute is provided. This means comprises, in general, a continuously rotating roller 88 and means for causing said roller 88 to contact and impart downward motion to the bottom anode in the chute.

Described in greater detail, the means for imparting motion to the bottom-most anode comprises a slide member 90 having a U-shaped frame 92. As shown in FIG. 2, frame 92 is opened at its right-hand end and is closed at its left end. The frame is shaped so that it slides between support means including the upper and lower plates 94 and 96 and the front and rear plates 40 and 42. A hole 98 is provided in the lateral support 30 for accepting the right-hand end of the slide 90. The bottom of the frame 92 is cut away at 100 to make room for the lower finger 46. A bracket 102 is fastened to a left support 103 underlying the lower support plate 96 and a spring 104 under compression is mounted on a pin 106 fastened to the U-shaped frame 92 between the bracket 102 and the U-shaped frame whereby the frame 92 is urged to the right as shown in FIGS. 2 and 3. The roller 88 may have a rubber-coated circumference and is mounted on an axle 108 which is journalled in holes 110 and 112 in the U-shaped frame 92 near the left or closed end of the slide 90. The axle 108 extends through slots 114 and 116 in front and rear plates 40 and 42, respectively, and a pulley 118 is mounted on an end of axle 108. A motor (not shown) rotates the pulley 118 clockwise in any well-known manner whereby the roller 88 rotates clockwise continuously. As noted above, the vertical bar 28 is cut away at 32 to permit roller 88 to move far enough to the right to contact the edges of the anode 10 in the chute 26.

Therefore, under urging of spring 104, the slide 90 moves to the right until the rotating roller 88 contacts the edges of the bottom anode 10 and urges it downward out of the chute 26. The anode is backed up during this contacting by the left-hand face of the lateral support 30. A backing strip 120 which extends through the U-shaped frame and across the opening 98 in the front support 30 may be supplied, if desired, to prevent jamming of the anode 10 in the hole 98 provided in lateral support 30 for the slide 90.

Means are provided for moving the slide 90 to the left so that the roller 88 will not be in continuous contact with the edges of an anode 10. Such a means prevents undue wear of the frictional surface of the roller 88 when the lower finger is in position to prevent the bottom anode 10 from leaving the chute 26. This means for moving the slide 90 to the left comprises a circular cam roller 122 and a cooperating arm 124 having a cam end 126. The cam roller 122 is mounted to rotate freely on pin 130 extending through and mounted in the U-shaped frame 92 near the right or opened end thereof. The cooperating arm 124 is pivoted between side plates 40 and 42 on pin 132 and is held in a horizontal position by tension spring 134 fastened between the right-hand end of arm 124 and the bottom plate 38 in cooperation with a linkage 138, to be described. In this horizontal position of arm 124, the cam end 126 thereof contacts cam roller 122 and holds the roller to the left and therefore the U-shaped slide 90 in such position that roller 88 does not contact the edges of anode 10. A solenoid 136 is mounted on upper plate 36 and is attached to the right-hand end of arm 124 by the linkage 138. Upon energization of solenoid 136, counter-clockwise rotation of arm 124 is caused. Upon counter-clockwise rotation of arm 124 to the position shown in dotted lines in FIG. 3, the cam end 126 of arm 124 no longer holds slide 90 to the left and spring 104 is permitted to push the slide 90 to the right. As noted above, the rotating roller 88 then comes into contact with the bottom anode 10 and starts it downward out of the chute 26. Upon deenergization of solenoid 136, the spring 134 turns the arm 124 clockwise and the cam end 126 thereof pushes the cam roller 122 and therefore the slide 90 back to its left-hand rest position. Since the two solenoids 80 and 136 are energized simultaneously, whereby the lower-most anode is released by finger 46 at substantially the same time that the roller 88 contacts the edges of the lower-most anode 10, one solenoid may be used if desired. During deenergization of both solenoids, the various elements are in the position shown in FIG. 3. Upon energization of both solenoids, the upper finger 44 is moved to the left to contact the next-to-the-bottom anode 10 and also the lower finger 46 is retracted to the right out of the chute 26 and the arm 124 is moved to its dotted position in FIG. 3 whereby the slide 90 is moved so far to the right that the roller 88 contacts the edges of the lower-most anode.

It will be understood that, while my means for freeing tube parts is shown in connection with a particular chute structure, this is merely illustrative. My feeding means can be used in conjunction with any suitable shape of chute or any type of escapement where the element to be fed is not held at the time that my freeing and feeding means contacts it. Similarly, while my freeing means is shown in combination with a channel-type anode, it can be used with any shape of anode or element which can be fed and with which my feed roller can be brought into contact.

What is claimed is:

1. In combination, a chute comprising a guide member having a hole extending transversely therethrough, support means mounted adjacent said chute and said hole, and a slide member slidably mounted on said support means, a portion of said slide member extending through said hole, said slide member having two ends, a roller mounted on one of said ends, and a cam follower mounted on the other of said ends, means for rotating said roller, cam means cooperating with said cam follower for moving said slide member in one direction through said hole, and resilient means for moving said slide member in the opposite direction through said hole.

2. In combination, a chute comprising a guide means along which a series of articles may be advanced, escapement means operatively associated with said chute and comprising a pair of spaced fingers, means for moving one of said fingers at least partially into said chute and into blocking relation with respect to the leading article of said series of articles, and means for moving the other of said fingers at least partially into said chute and into blocking relation with respect to the article next following said leading article, said fingers being alternately movable, and means for advancing said leading article along said chute, said last-named means comprising a support means mounted adjacent said guide means, and a slide member mounted on said support means for movement transversely of said guide means, a roller mounted adjacent an end of said slide member, means for rotating said roller, and means including a cam and a cam follower operatively associated with said slide member for moving said slide member in one direction for causing engagement of said roller with said leading article when said one finger is out of blocking relation with respect to said leading article and for moving said slide member in the opposite direction when said one finger is in blocking relation with respect to said leading article.

3. In combination, a chute comprising a guide means along which a series of articles may be moved, an escapement means for permitting movement of one article at a time, and an article moving means for moving an article permitted movement by said escapement means along said chute, said moving means including a support means mounted adjacent said guide means, and a slide member slidably mounted on said support means for movement transversely of said guide member, said slide member having two ends, a roller mounted on one of said ends, means for rotating said roller, and means for moving said slide member transversely of said guide means and in a first direction for causing engagement of said roller with an article released for movement by said escapement means and for moving said slide member in a second direction opposite to said first direction, said last-named means comprising a cam follower mounted on the other one of said ends of said slide member, cam means cooperating with said cam follower for moving said slide member in one of said two directions, and resilient means for moving said slide member in the other of said two directions.

4. In combination, a chute comprising a guide means along which articles may be moved, said chute having an opening therethrough, escapement means operatively associated with said chute and comprising a pair of spaced fingers, means for moving one of said fingers at least partially into said chute and into blocking relation with respect to an article in said chute, means for moving another of said fingers at least partially into said chute and into blocking relation with respect to a different article in said chute, said fingers being alternately movable, and means for moving an article between said fingers along said chute, said last-named means comprising a support means mounted adjacent said guide means and said opening, a slide member mounted on said support means and extending through said opening, said slide member having two ends, a roller mounted on said slide member near one of said ends, means for rotating said roller, and means for moving said slide member in a first direction through said opening for causing engagement of said roller with said article between said fingers and for moving said slide member in a second direction opposite to said first direction, said last-named means comprising a cam follower mounted on said slide member near the other of said ends thereof, cam means cooperating wth said cam follower for moving said slide member in one of said two directions, and resilient means for moving said slide member in the other of said two directions.

References Cited in the file of this patent

UNITED STATES PATENTS

| | | |
|---|---|---|
| 846,806 | Skipp | Mar. 12, 1907 |
| 2,525,823 | Mozel | Oct. 17, 1950 |
| 2,825,191 | Batchelder | Mar. 4, 1958 |
| 2,907,154 | Batchelder | Oct. 6, 1959 |
| 2,988,355 | Rabinow et al. | June 13, 1961 |
| 3,007,604 | Lukawich | Nov. 7, 1961 |